May 12, 1925.
A. E. OSBORN
1,537,546
INTERNAL COMBUSTION ENGINE
Original Filed Jan. 14, 1920
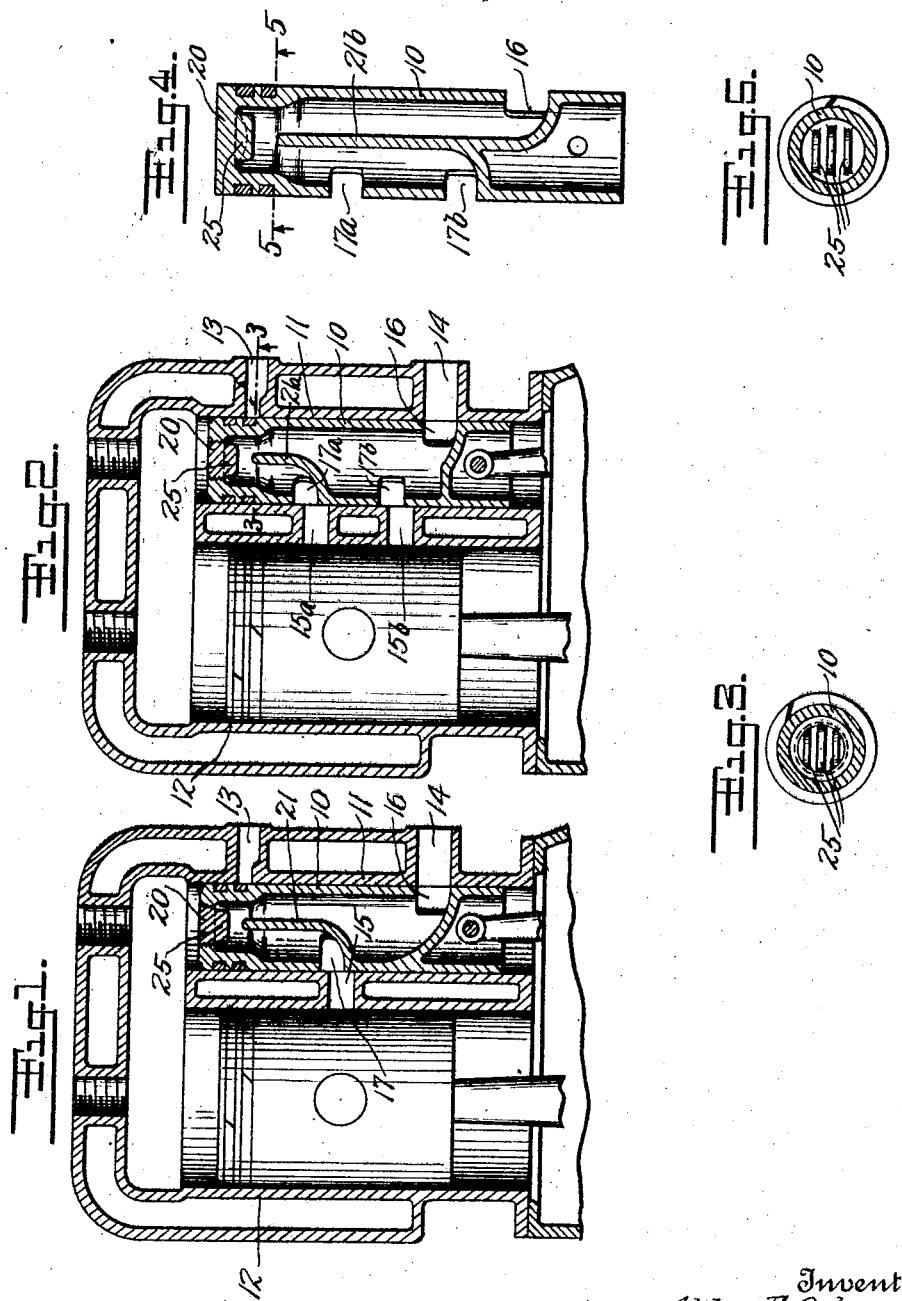
Inventor
Alden E. Osborn
By his Attorney
E. W. Marshall

Patented May 12, 1925.

1,537,546

UNITED STATES PATENT OFFICE.

ALDEN E. OSBORN, OF NEW YORK, N. Y.

INTERNAL-COMBUSTION ENGINE.

Application filed January 14, 1920, Serial No. 351,345. Renewed March 10, 1925.

*To all whom it may concern:*

Be it known that I, ALDEN E. OSBORN, a citizen of the United States of America, and a resident of the city, county, and State of New York, have invented certain new and useful Improvements in Internal-Combustion Engines, of which the following is a specification.

My present invention relates particularly to engines of the character disclosed in my Patents, #1,212,391 and 1,315,192 in which, both the intake and exhaust functions are controlled by a single valve of the reciprocating piston type.

The objects of the invention are to improve and increase the efficiency of such engines, particularly in the matter of cooling the valve and securing better vaporization or gasification of the fuel.

It has also been my aim to attain the results mentioned without complicating or materially adding to the expense of the engine.

Stated generally, the invention involves the utilization of the burned gases for heating the intake gas, by constructing the valve which controls the functions of the engine with a deflecting wall arranged to direct the incoming gas into contact with the wall of the valve which is exposed to the heat of the burned gas. The invention involves further the provision of the heated wall with heat radiating fins extending toward the deflecting wall and arranged to carry the heat into more intimate contact with the inflowing mixture.

Other features of the invention will appear as the specification proceeds and will be the more readily understood by consideration of the accompanying drawing, wherein I have illustrated the invention embodied in several of its different practical forms.

In the drawing referred to, Figure 1 is a broken sectional view of an engine of the single intake port type as disclosed in my Patent 1,212,391, above referred to, equipped with and embodying the features of the present invention.

Similarly, Figure 2 is a sectional view of the invention as applied to an engine of the double intake port type disclosed in my Patent 1,315,192.

Figure 3 is a sectional view of the same as taken on substantially the plane of line 3—3 of Figure 2.

Figure 4 is a vertical sectional view on an enlarged scale of a modified form of the valve shown in Figure 2.

Figure 5 is a transverse sectional view taken on substantially the plane of line 5—5 of Figure 4.

In the engines illustrated, a single engine driven valve 10 serves to control both the intake and the exhaust. This valve reciprocates in a valve chamber 11 in open communication at the top with the combustion chamber of the cylinder 12. Opening into the valve chamber adjacent the upper end thereof is the exhaust port 13 and opening into the lower portion of the same is the intake port 14.

In the first type of engine illustrated, the fresh gas is admitted into the working cylinder through a single intake port 15 and the valve, which is of hollow or tubular construction, is in this form provided with a port 16 in the outer side thereof for registry with port 14 and with a single port 17 in the opposite or inner side thereof for registry with the cylinder admission port 15.

In its passage through the intake valve from the inlet port 16 to the outlet port 17, the intake gas is directed toward and into contact with the upper end wall or head 20 of the valve, by means of a deflecting wall 21 which, in the first form illustrated, is shown as extending from the lower edge of the outlet port 17 toward and relatively close to the exhaust-heated wall 20. In this way the intake gas is directed toward and into engagement with the head of the piston valve which is heated by the burned gases and consequently, the intake gas, by the time it is admitted to the cylinder, has taken up considerable of the heat of the burned gas and is thereby properly vaporized. This feature naturally is of special value where heavy oils are employed as fuel.

The vaporizing effect is increased by providing the head of the valve with one or a series of dependent heat radiating fins 25 which project down into the hollow valve toward and closely adjacent to the deflecting wall 21. These fins may be arranged as indicated, that is, parallel to the flow of gas through the valve so as to break up the gas into a plurality of relatively thin streams, which enables the heat to be transmitted quite uniformly to the entire body of the gas as well as thoroughly "breaking up" the gas.

The engine illustrated in Figure 2 is as above stated, of the double intake port type like that disclosed in my Patent 1,315,192 and having in place of the single intake port 15, a pair of vertically spaced intake ports 15ª and 15ᵇ, with which register at the proper times the outlet ports 17ª and 17ᵇ in the valve 10, said valve having as before an inlet port 16 for registry with the port 14 in the valve chamber. In this case the deflecting wall 21ª is shown as extending from the lower edge of the upper outlet port 17ª.

With this construction, that portion of the intake gas which passes out through the ports 17ª and 15ª into the cylinder is more highly heated than the gas passing through the lower set of ports 17ᵇ and 15ᵇ. This, in some instances, may be advantageous and in other cases, it may be desirable to heat the divided streams of gas more uniformly as accomplished in the valve shown in Figure 4. In this view the deflecting wall 21ᵇ is shown as extended from the lower edge of the lower outlet port 17ᵇ which means that the flow of gas to both said ports will be substantially equally heated. In the valve under consideration I have also shown how the gas-heated head of the valve may be formed integrally instead of as in the form of an inserted or screwed-in plug, as shown in Figures 1, 2 and 3.

What I claim is:

1. In an internal combustion engine, a piston, a tubular intake valve of the piston type having the head thereof exposed at all times to the heat and pressure of the burning gases, said tubular valve having ports in the sides thereof and a deflecting wall between said ports extending toward the head of the valve for directing the incoming gases in their passage from one port to the other toward the gas-heated head of the valve.

2. In an internal combustion engine, a piston, a tubular intake valve of the piston type having the head thereof exposed at all times to the heat and pressure of the burning gases, said tubular valve having ports in the sides thereof, a deflecting wall between said ports extending toward the head of the valve for directing the incoming gases in their passage from one port to the other toward the gas-heated head of the valve and said valve head having a dependent heat radiating fin or fins extending into the tubular valve toward the deflecting wall aforesaid.

3. In an internal combustion engine, a piston, a hollow intake valve having a wall at one end exposed to the heat and pressure of the burning gases during the power stroke and provided with inlet and outlet ports in the sides thereof for the intake gas and a deflecting wall within the hollow valve and extending from the lower side of one of the ports therein toward and adjacent to the gas-heated wall to thereby deflect the intake gases passing from one port to the other into contact with such wall.

4. In an internal combustion engine, a piston, a hollow intake valve having a wall at one end exposed to the heat and pressure of the burning gases during the power stroke and provided with inlet and outlet ports in the sides thereof for the intake gas and a deflecting wall within the hollow valve and extending from the lower side of the outlet port therein toward and adjacent to the gas-heated wall to thereby deflect the intake gases passing from one port to the other into contact with such wall.

5. In an internal combustion engine, a piston, a hollow intake valve of the piston type having the head thereof exposed to the heat and pressure of the burning gases during the power stroke of the engine and provided below said head with inlet and outlet ports in opposite sides thereof for the intake gas, a deflecting wall extending from adjacent one edge of one of said ports toward the gas-heated head of the valve and a heat radiating fin or fins dependent from the gas-heated head and projecting toward the deflecting wall aforesaid.

6. In an internal combustion engine, a cylinder provided with double intake ports separated longitudinally of the cylinder, a piston in said cylinder, a hollow piston valve having a head exposed to the burned gases of the engine and provided in one side thereof with an inlet port and in the opposite side thereof with a pair of longitudinally separated ports to register with the intake ports aforesaid, said hollow piston valve having a deflecting wall between the inlet and outlet ports of the valve extending from a position adjacent the edge of one of said two outlet ports toward the gas heated head of the piston valve.

7. In an internal combustion engine, a piston, a hollow intake piston valve having a passage therethrough for intake gas and having the head of said piston valve forming one wall of said passage and exposed to the heat and pressure of the burning gases of the engine, and said head of the piston valve having a heat radiating fin or fins projecting into said passage and extending substantially in line with the direction of flow of the intake gas to thereby divide the same into a series of streams each directly receiving heat from the fin or fins.

8. In an internal combustion engine, a piston, a hollow intake piston valve having a passage therethrough for intake gas and having the head of said piston valve forming one wall of said passage and exposed to the heat and pressure of the burning gases of the engine, said head of the piston valve having a heat radiating fin or fins projecting into said passage and extending substantially in line with the direction of flow of the intake gas to thereby divide the same into a series of streams each directly receiving heat from the fin or fins and a deflecting wall extending toward and adjacent to the fin or fins for requiring the intake gas to pass into intimate contact with the fin or fins.

9. An internal combustion engine comprising a cylinder, a piston therein, a second cylinder adjacent to the first cylinder, an intake passage between said two cylinders opening into the first cylinder within the stroke of the head of the piston therein, a hollow piston valve in the second cylinder having a head exposed at all times to the heat and pressure of the burning gases and provided with an inlet port and with an outlet port adapted to co-act with the intake passage between the cylinders to open or close the same and a deflecting wall within the hollow piston valve disposed to deflect the gases passing through from the inlet to the outlet port into contact with the heated head of the valve.

In witness whereof, I hereunto set my hand this 12th day of January, 1920.

A. E. OSBORN.